(12) United States Patent
Shafer et al.

(10) Patent No.: US 7,921,546 B2
(45) Date of Patent: *Apr. 12, 2011

(54) METHOD FOR MAKING A HIGH CURRENT LOW PROFILE INDUCTOR

(75) Inventors: Timothy M. Shafer, Yankton, SD (US); Brett W. Jelkin, Windsor, CO (US)

(73) Assignee: Vishay Dale Electronics, Inc., Columbus, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/013,725

(22) Filed: Jan. 14, 2008

(65) Prior Publication Data

US 2008/0110014 A1    May 15, 2008

Related U.S. Application Data

(62) Division of application No. 11/782,020, filed on Jul. 24, 2007, now Pat. No. 7,345,562.

(51) Int. Cl.
*H01F 7/06* (2006.01)

(52) U.S. Cl. ............ 29/606; 29/602.1; 29/841; 29/848; 29/856; 29/858; 336/65; 336/83; 336/192; 336/200; 336/232; 363/17; 363/48; 363/58

(58) Field of Classification Search ............... 29/602.1, 29/606, 841, 848, 856, 858, 883; 336/65, 336/83, 90–96, 192, 200, 206–208, 232; 363/17, 48, 58

See application file for complete search history.

(56) References Cited

U.S. PATENT DOCUMENTS

| | | | |
|---|---|---|---|
| 1,994,534 A | 3/1935 | Robinson |
| 2,118,291 A | 5/1938 | Bollman |
| 2,154,730 A | 4/1939 | Cox |
| 2,391,563 A | 12/1945 | Goldberg |
| 2,457,806 A | 1/1949 | Crippa |
| 2,568,169 A | 9/1951 | Raczynski |
| 2,850,707 A | 9/1958 | Wroblewski |
| 2,966,704 A | 1/1961 | O'Brian |
| 3,201,729 A | 8/1965 | Blanchi |
| 3,235,675 A | 2/1966 | Blume |
| 3,255,512 A | 6/1966 | Lochner |

(Continued)

FOREIGN PATENT DOCUMENTS

CH    179-582    9/1935

(Continued)

OTHER PUBLICATIONS

IHSM Preliminary Data Sheet, Jul. 2, 1993 (p. 1).

(Continued)

*Primary Examiner* — Paul D Kim
(74) *Attorney, Agent, or Firm* — Volpe and Koenig, P.C.

(57) ABSTRACT

A method for making a high current low profile inductor includes forming an inductor element comprising a coil having an open center and an outside surface, the coil also having first and second coil ends, making a dry mixture comprising a dry resin and an insulated dry powdered magnetic powder, and compressing the dry mixture around the outside surface of the coil and within the open center of the coil to create an inductor body without liquefying the dry mixture, whereby the inductor body engages the coil both within the coil open center and also the coil outside surface.

2 Claims, 3 Drawing Sheets

U.S. PATENT DOCUMENTS

| | | | |
|---|---|---|---|
| 3,380,004 A | 4/1968 | Hansen | |
| 3,554,797 A | 1/1971 | Coerver, Jr. | |
| 3,653,986 A * | 4/1972 | Pingel | 148/104 |
| 3,678,345 A | 7/1972 | Hvidtfeld | |
| 3,953,251 A | 4/1976 | Butherus et al. | |
| 4,146,854 A | 3/1979 | Ishino | |
| 4,177,089 A | 12/1979 | Bankson | |
| 4,543,554 A | 9/1985 | Muellenheim | |
| 4,601,765 A * | 7/1986 | Soileau et al. | 148/104 |
| 4,696,100 A | 9/1987 | Yamamoto | |
| 4,736,513 A | 4/1988 | Barbier et al. | |
| 4,776,980 A | 10/1988 | Ruffini | |
| 4,785,527 A | 11/1988 | Bernard et al. | |
| 5,023,578 A | 6/1991 | Kaneko | |
| 5,034,710 A | 7/1991 | Kawaguchi | |
| 5,160,447 A | 11/1992 | Ishikawa et al. | |
| 5,184,105 A | 2/1993 | Endo | |
| 5,291,173 A | 3/1994 | Yerman | |
| 5,338,617 A * | 8/1994 | Workinger et al. | 428/551 |
| 5,359,311 A | 10/1994 | Kawabata | |
| 5,381,124 A | 1/1995 | Roshen | |
| 5,398,400 A | 3/1995 | Breen | |
| 5,414,401 A | 5/1995 | Roshen | |
| 5,446,428 A | 8/1995 | Kumeji | |
| 5,495,213 A | 2/1996 | Ikeda | |
| 5,551,146 A | 9/1996 | Kawabata | |
| 5,875,541 A | 3/1999 | Kumeji | |
| 5,884,990 A | 3/1999 | Burghartz | |
| 5,912,609 A | 6/1999 | Usui | |
| 6,063,209 A | 5/2000 | Matsutani | |
| 6,198,375 B1 | 3/2001 | Shafer | |
| 6,204,744 B1 | 3/2001 | Shafer | |
| 6,460,244 B1 | 10/2002 | Shafer | |
| 7,034,645 B2 * | 4/2006 | Shafer et al. | 336/83 |
| 7,081,803 B2 | 7/2006 | Takaya | |
| 7,263,761 B1 * | 9/2007 | Shafer et al. | 29/602.1 |
| 7,265,651 B2 | 9/2007 | Brunner | |
| 2002/0017972 A1 | 2/2002 | Hsu | |

FOREIGN PATENT DOCUMENTS

| | | |
|---|---|---|
| DE | 364 451 | 11/1922 |
| DE | 1 370 019 | 3/1936 |
| DE | 1 764 087 | 4/1971 |
| DE | 2132378 | 1/1973 |
| DE | 28 11 227 | 9/1978 |
| DE | 40 23 141 A1 | 1/1992 |
| EP | 0212812 | 4/1987 |
| EP | 0439389 | 7/1991 |
| EP | 0469609 | 5/1992 |
| FR | 2721431 | 12/1995 |
| GB | 1272888 | 5/1972 |
| GB | 2044550 A | 10/1980 |
| GB | 2303494 A | 2/1997 |
| JP | 55 77113 | 6/1980 |
| JP | 58 188108 | 11/1983 |
| JP | 185809 | 12/1984 |
| JP | 60 034008 | 2/1985 |
| JP | 61-0184806 | 8/1986 |
| JP | 62 013005 | 1/1987 |
| JP | 63 79306 | 4/1988 |
| JP | 63-0104407 | 5/1988 |
| JP | 63-0161602 | 7/1988 |
| JP | 01-0199415 | 8/1989 |
| JP | 01-0228107 | 9/1989 |
| JP | 1 266705 | 10/1989 |
| JP | 1 167011 | 11/1989 |
| JP | 02-0062012 | 3/1990 |
| JP | 2-118919 | 9/1990 |
| JP | 3-169002 | 7/1991 |
| JP | 04-0062804 | 2/1992 |
| JP | 04 15507 | 4/1992 |
| JP | 4-115507 | 4/1992 |
| JP | 04115507 A * | 4/1992 |
| JP | 04129206 | 4/1992 |
| JP | HEI-04-11507 A | 4/1992 |
| JP | 4-70712 | 6/1992 |
| JP | 04196507 | 7/1992 |
| JP | 04-0215412 | 8/1992 |
| JP | 4-286305 | 10/1992 |
| JP | 04 286305 | 10/1992 |
| JP | 04-0358003 | 12/1992 |
| JP | 4 373112 | 12/1992 |
| JP | 5 283238 | 10/1993 |
| JP | HEI-05-291046 A | 11/1993 |
| JP | 6 61059 | 3/1994 |
| JP | 07-0320938 | 12/1995 |
| JP | 63 278317 | 11/1998 |
| JP | 05-0267066 | 8/2009 |
| WO | 92 05568 | 4/1992 |
| WO | WO 96/02345 | 2/1996 |
| WO | 00-55873 | 9/2000 |

OTHER PUBLICATIONS

Redacted Dale Monthly Report, Jul. 1993 (pp. 2-3).
Memorandum From Brett Jelkin/To Jerry Hoffman, Aug. 2, 1993 (p. 4).
Fax From Jeff Heaton/To Kelly Knifel, Aug. 11, 1993 (pp. 5-8).
Handwritten Notes, Aug. 27, 1993 (p. 9).
Trip Report, Aug. 31, 1993 (p. 10).
Factory Work Order, Sep. 14, 1993 (p. 11).
Redacted Drawings, Sep. 14, 1993 (pp. 12-13).
Redacted Handwritten Notes, Sep. 14, 1993 (p. 14).
Phone Conversation (From Brett Jelkin/To Jon Cronk) Report, Sep. 20, 1993 (p. 15).
Redacted Drawing, Sep. 27, 1993 (p. 16).
Redacted Handwritten Equations, Sep. 29, 1993 (p. 17).
Redacted Factory Work Order, Oct. 1, 1993 (p. 18).
Redacted Drawings, Sep. 29, 1993 (pp. 19-20).
Redacted Handwritten Letter From Brett Jelkin/To Jon Cronk, Oct. 7, 1993 (pp. 21-22).
Redacted Fax From Doug Brackhan/To Jerry Hoffman And Brett Jelkin, Oct. 22, 1993 (pp. 23-24).
Redacted Handwritten Notes, Oct. 25, 1993 (p. 25).
Redacted Routing Slip, Nov. 1, 1993 (p. 26).
Redacted Letter From Doug Moen/To Bret Jelkin, Oct. 28, 1993 (p. 27).
Redacted Letter From Doug Moen/To Bret Jelkin With Handwritten Note From Jerry/To Ron Heglin, Nov. 8, 1993 (p. 28).
Redacted Request for Quotation, Nov. 18, 1993 (p. 29).
Handwritten Letter From Brett/To Mike R., Nov. 22, 1993 (p. 30).
Routing Slip, Nov. 23, 1993 (p. 31).
Redacted Fax Quote From Gregory Fancon/To Michael Rhorer, Nov. 29, 1993 (p. 32).
Redacted Fax Quote From Ray Youberd/To Michael Rhorer, Dec. 1, 1993 (p. 33).
Redacted Fax Quote From Nancy Roake/To Michael Rhorer, Dec. 2, 1993 (p. 34).
Redacted Request For Quotation From Michael Rhorer/To Brett Jelkin, Nov. 18, 1993 (p. 35).
Fax From Val Lichter/To Jerry Hoffman, Jan. 20, 1994 (pp. 36, 39-41).
Redacted Quotation From Kelly Kneifl/To Ken Fong, Dec. 22, 1993 (p. 37).
Handwritten Fax From Jerry Hoffman/To Val Lichter, Jan. 27, 1994 (p. 38).
Redacted Letter From Jon Cronk And Dick Walsh/To Kelly Kneifl, Feb. 2, 1994 (pp. 42-43).
Same Letter As No. 31 With Handwritten Notes/Redactions, Feb. 2, 1994 (pp. 44-45).
Trip Report, Feb. 7, 1994 (pp. 46-47).
Temperature Graph, Feb. 10, 1994 (p. 48).
Sumida New Products Page With Handwritten Notes, Feb. 23, 1994 (p. 49).
Handwritten/Redacted Notices Of Switcher IC Manufacturers Visited, Mar. 1, 1994 (p. 50).
Routing Slip, Mar. 3, 1994 (p. 51).
Routing Slip, Mar. 3, 1994 (p. 52).
Agenda For Customer/Field Rep Visit, Mar. 23, 1994 (pp. 53-56).
Handwritten Letter From Brett J./To Tim S. (two copies), Mar. 30, 1994 (pp. 57-58).

Handwritten Letter From Tim/To Brett, Mar. 31, 1994 (p. 59).
Redacted Handwritten Letter With Drawings From Brett J./To Tim, Mar. 31, 1994 (pp. 60-62).
Redacted Notes Of National Semiconductor Visit From Kelly Kneifl, Apr. 3, 1994 (pp. 63-64).
Redacted Telephone Conversation (From John Cronk/To Kelly Kneifl) Report, Apr. 4, 1994 (pp. 65-66).
Fax From Jon Cronk/To Brett Jelkin, Apr. 5, 1994 (p. 67).
Handwritten Notes (National Semiconductor), Apr. 7, 1994 (pp. 68-72).
Redacted Agenda For Customer/Field Rep Visit, Apr. 7, 1994 (pp. 73-74).
Redacted Handwritten Letter From Brett J./To Gene, Apr. 8, 1994 (p. 75).
Letter From Jon Cronk/To Jim Cox, Apr. 6, 1994 (p. 76).
Faxed Redacted Meeting (Apr. 7, 1994) Minutes, Apr. 8, 1994 (pp. 77-81).
Handwritten Specifications, Jun. 12, 1994 (p. 242).
Redacted Telephone Conversation Report From E. Gorsett/To Macey Keegan And Don Alfson, Jun. 13, 1994 (p. 243).
Telephone Conversation Report From Tim Shafer And Brett Jelkin/ To Jon Cronk, Jun. 14, 1994 (p. 244).
Flatpack Ribbon Wire Evaluation From Brett Jelkin, Jun. 14, 1994, Forwarded To Gene By Jerry, Jun. 14, 1994 (pp. 245-246).
Redacted Telephone Conversation Report From Brett Jelkin/To Jon Cronk, Jun. 15, 1994 (p. 247).
Handwritten Notes, Jun. 16, 1994 (pp. 248-249).
Correspondence From Brett Jelkin/To Barbara Lichter, Jun. 17, 1994, Forwarded To Gene By Jerry, Jun. 17, 1994 (pp. 250-251).
Redacted Telephone Conversation Report From Brett Jelkin/To Jon Cronk, B. Jelkin And T. Shafer, Jun. 22, 1994 (pp. 252-253).
Print, Jul. 6, 1994 (p. 254).
Factory Work Order From Tim Shafer, Jun. 30, 1994 (p. 255).
Handwritten Correspondence From J. Wilson/To Phyllis, Undated (p. 256).
Redacted Handwritten Specifications, Jun. 30, 1994 (p. 257).
Fax From Joe Arlt/To Tim Shafer, Jun. 30, 1994 (p. 258).
Drawing, Jun. 30, 1994 (p. 259).
Handwritten Note From Doug B./To Brett Jelkin, Jul. 1, 1994 (p. 260).
Handwritten Notes/Specifications, Jul. 6, 1994 (pp. 261-263).
Handwritten Specifications, Jul. 6, 1994 (p. 264).
Redacted Request For Purchase Order From Tim Shafer, Jul. 6, 1994 (p. 265).
Drawing, Undated (p. 266).
Fax From Tim Shafer/To Dave Lange, Jul. 13, 1994 (pp. 267-269).
Fax From Jon Cronk/To Bret Jelkin And Tim Shafer, Jul. 13, 1994 (pp. 270-272).
Request For Purchase Order From Tim Shafer, Jul. 13, 1994 (p. 273).
Handwritten Specifications From Brett J., Jul. 14, 1994 (p. 274).
Memorandum From Tim Shafer/To Herman Person, Jul. 14, 1994 (pp. 275-279) Forwarded By Jerry To Gene Gorsett And Doug Brackhan, Jul. 15, 1994 (pp. 280-284).
Redacted Purchase Order, Jul. 15, 1994 (p. 285).
Redacted Handwritten Correspondence From Brett J./To Jerry, Jul. 15, 1994 (p. 286).
Fax From Jon Cronk/To Bret Jelkin And Tim Shafer, Jul. 18, 1994 (pp. 287-289).
LM2825 Series 1 Amp DC-DC Converter Brochure, Jul. 20, 1994 (pp. 290-292).
Redacted Memorandum From Kelly Kneifl/To Jon Cronk, Jul. 20, 1994 (p. 293).
Drawing, Jul. 26, 1994 (p. 294).
Handwritten Specifications From Brett J., Aug. 4, 1994 (p. 295).
Handwritten Specifications, Aug. 1994 (pp. 296-297).
Handwritten Specifications, Aug. 14, 1994 (p. 298).
Handwritten Specifications From Brett J., Aug. 18, 1994 (pp. 299-300).
Handwritten Specifications, Aug. 19, 1994 (p. 301).
Handwritten Specifications, Aug. 22, 1994 (pp. 302-303).
Handwritten Specifications, Aug. 23, 1994 (p. 304).
Handwritten Specifications, Aug. 29, 1994 (p. 305).
Telephone Conversation Report From Brett Jelkin/To Pen-Cheng Lin, Aug. 30, 1994 (p. 306).
Fax From Tim Shafer/To Steve Rosse, Aug. 31, 1994 (pp. 307-308).
Redacted Correspondence from Doug Moen/To Bret Jelkin, Aug. 31, 1994 (p. 309).
Handwritten Specifications, Aug. 31, 1994 (p. 310).
Evaluation of Dale Copper Ribbon, P/N 642757-03, Sep. 7, 1994 (p. 311).
Specifications, Sep. 8, 1994 (p. 312).
Handwritten Specifications, Sep. 6, 1994 (p. 313).
Memorandum From Will Dangler/To Bruce Waring And Jim Lincoln, Sep. 7, 1994 (pp. 314-318).
DC/DC Converter Information From PD&D/Sep. 1994 With Handwritten Notes, Sep. 13, 1994 (p. 319).
Handwritten Notes From Brett J., Sep. 21, 1994 (p. 320).
Drawing, Sep. 22, 1994 (p. 321).
Handwritten Specifications, Sep. 22, 1994 (p. 322).
Handwritten Specifications, Sep. 23, 1994 (p. 323).
Memorandum From Doug Brackhan/To Brett Jelkin And Tim Shafer, Sep. 24, 1994 (pp. 324-326).
Memorandum From Tim Shafer/To Doug Brackhan, Oct. 7, 1994 (p. 327).
Redacted Correspondence From Charles Harrison/To Tim Shafer, Oct. 7, 1994 (pp. 328-336).
Fax From Vicki Clements/To Tim Shafer, Oct. 7, 1994 (pp. 337-341).
Handwritten Specifications, Oct. 10, 1994 (pp. 342-345).
Fax From Vicki Clements/To Tim Shafer, Oct. 11, 1994 (pp. 346-353).
Memorandum From Tim Shafer And Brett Jelkin/To Jerry Hoffman With Handwritten Notes From Various Parties, Oct. 18, Oct. 20, 1994 (pp. 354-355); Clean Memorandum, Oct. 14, 1994 (pp. 356-357).
Redacted IHLP-38 And -47 High-current-low Profiled—Surface Mount Tooling Estimates, Undated (p. 358).
Handwritten Notes, Oct. 19, 1994 (p. 359).
Print, Oct. 19, 1994 (p. 360).
Request For Purchase Order From Tim Shafer, Oct. 21, 1994 (p. 361).
Memorandum From Craig Harris/To Jerry Hoffman, Oct. 21, 1994, With Handwritten Note From Jerry/To Marlene, Oct. 26, 1994 (pp. 362-363).
Handwritten Note From Brett J./To Tim, Undated (p. 364).
Drawing From Peng-Cheng Lin, Mar. 15, 1994 (p. 365).
Redacted Purchase Order From T. Shafer, Oct. 24, 1994 (p. 366).
Redacted Invoice, Oct. 24, 1994 (p. 367).
Handwritten Specifications, Oct. 27, 1994 (pp. 368-369).
Handwritten Specifications, Oct. 28, 1994 (pp. 370-371).
Handwritten Specifications, Oct. 31, 1994 (p. 372).
Fax From Dave Pa??/To Brett Jelkin, Oct. 26, 1994 (p. 373).
Handwritten Specifications, Oct. 31, 1994 (p. 374).
Handwritten Specifications, Drawings, Nov. 2, 1994 (p. 375).
Statistics, Nov. 9, 1994 (p. 376).
Statistics, Nov. 14, 1994 (p. 377).
Statistics With Handwritten Notes, Nov. 9, 1994 (p. 378).
Handwritten Test Results, Nov. 11, 1994 (p. 379).
Handwritten Specifications, Nov. 11, 1994 (pp. 380-381).
Drawing Specifications, Nov. 14, 1994 (p. 382).
Handwritten Specifications, Nov. 14, 1994 (pp. 383-384).
Handwritten Notes, Nov. 15, 1995 (p. 385).
Fax And Specifications From Barbara Lichter/To Brett Jelkin And Tim Shafer, Nov. 15, 1994 (pp. 386-387).
Drawings By TMS, Nov. 17, 1994 (pp. 388-390).
Factory Work Order From Tim Shafer, Nov. 18, 1994 (p. 391).
Specifications, Nov. 18, 1994 (p. 392).
Memorandum From Tim Shafer And Brett Jelkin/To Dave Lange, Nov. 21, 1994 (pp. 393-394).
Memorandum From David Lange/To Tim Shafer And Brett Jelkin, Nov. 22, 1994 (pp. 395-396).
Procedure For Pressing IHLP Parts, Nov. 23, 1994 (pp. 397-400).
Telephone Conversation Report From Brett Jelkin/To Jon Cronk, B. Jelkin And T. Shafer, Nov. 28, 1994 (p. 401).
Specifications, Dec. 2, 1994 (p. 402).
Redacted Specifications With Handwritten Note To Tim, Undated (p. 403).

Redacted Patent Disclosure for IHLP Inductor By Tim Shafer, Dec. 16, 1994 (pp. 404-406).
Redacted Handwritten Notes, Undated (p. 407).
Handwritten Routing Slip With Note From Tim/To Jerry, Dec. 22, 1994, With Return Note From Jerry/To Tim Jan. 3, 1995 (pp. 408-413).
Redacted Telephone Conversation Report From Kelly Kneifl/To Macey Keegan, Jan. 17, 1995 (p. 414).
Redacted Telephone Conversation Report From Brett Jelkin/To Jon Cronk, Jan. 17, 1995 (pp. 415-416).
Redacted Drawing By TMS, Jan. 19, 1995 (p. 417).
Redacted Memorandum From Kelly Kneifl/To Macey Keegan, Jan. 24, 1995 (p. 418).
Redacted Monthly Job Charges, Jan. 31, 1995 (p. 419).
Redacted Inventory Distribution Report, Jan. 31, 1995 (p. 420).
Redacted Specifications Forwarded To Tim, Undated (p. 421).
Fax From Jim Holmberg/To Scott Zwick, Gary Bougger, Tim Shafer And Will Dangler, Feb. 7, 1995 (p. 422).
Redacted Memorandum From Tim Shafer/To Doug Brackhan, Feb. 10, 1995 (p. 423).
Redacted Memorandum From Brett Jelkin/To Kelly, Feb. 15, 1995 (p. 424).
Redacted Quote From Columbus on Automated Equipment, Feb. 15, 1995 (p. 425).
Redacted Worksheets, Undated (pp. 426-427).
Redacted Memorandum From Brian Wolf/To Tim Shafer, Feb. 17, 1995 (p. 428).
Redacted Memorandum From Kelly Kneifl/To Brett, Feb. 17, 1995 (p. 429).
Handwritten Notes, Feb. 21, 1995 (p. 430).
Redacted Worksheets With Handwritten Notes, Feb. 21, 1995 (pp. 431-436).
Fax From Tim Shafer/To Mike Voorhees, Feb. 22, 1995 (pp. 437-438).
Redacted Correspondence From Brett Jelkin/To Jon Cronk, Feb. 22, 1995 (p. 439).
Handwritten Notes From Brett J. To Tim, Undated (p. 440).
Redacted Memorandum From Kelly Kneifl/To Wesley Hsu, Feb. 22, 1995 (pp. 441-443.
Redacted Worksheets, Feb. 21, 1995 (pp. 444-450).
Memorandum From Kelly Kneifl/To Wesley Hsu, Feb. 22, 1995 (pp. 451-453).
Redacted Worksheets, Feb. 21, 1995 (pp. 454-457).
Redacted Specifications With Handwritten Notes From Brett J./To Tim S. And Steve B., Feb. 23, 1995 (p. 458).
Memorandum From Tim Shafer/To Jon Cronk, Feb. 29, 1995 (p. 459).
Correspondence From Brett Jelkin And Tim Shafer/To Jon Cronk, Mar. 1, 1995 (p. 460).
Handwritten Memorandum From Don Korus/To Mike, Mar. 1, 1995 (p. 461).
Telephone Conversation Report From Jon Cronk/To Kelly Kneifl, Mar. 1, 1995 (pp. 462-463).
Wound Magnetics Journal, "Tension Devices for Foil Conductors" by John J. Bradley, Jan.-Mar. 1995 (pp. 464-466).
Redacted Change Order From Tim Shafer, Mar. 8, 1995 (pp. 467-468).
Fax With Handwritten Notes From Dick Gab/To Steve Klekman, Mar. 17, 1995 (pp. 469-471).
Drawing, Mar. 28, 1995 (p. 472).
Worksheet With Handwritten Notes, Apr. 19, Apr. 17, May 5, May 15, and May 17, 1995 (pp. 473-474).
Correspondence From Ron Barba/To Brett Jelkin, Apr. 11, 1995 (p. 475).
Drawing, Apr. 11, 1995 (p. 476).
National Semiconductor Office Visit Notes From Bruce Tschosik, Apr. 27, 1995 (pp. 477-480).
Redacted Worksheets, Undated (pp. 481-482).
Memorandum From Doug Brackhan/To Dave Lange, Bob Nienkemp And Rod Brune, May 10, 1995 (p. 483).
Drawing By TMS, May 17, 1995 (p. 484).
Redacted Performance Requirements IHLP Wind/Weld/Bond Equipment With Handwritten Notes By Brett Jelkin, May 17, 1995 (p. 485).
Drawing By Jerry Webber, May 17, 1995 (p. 486).
Redacted Quote From C. C. Edwards/To Ron Heglin, May 17, 1995 (p. 487).
Redacted Performance Requirements For IHLP Press By Tim Shafer, May 17, 1995 (pp. 488-489).
Redacted Performance Requirements IHLP Wind/Weld/Bond Equipment By Brett Jelkin, May 17, 1995 (p. 490).
Redacted Meeting (Steve, Jerry, Tim, Brett, (Dan, S), Bob, Rod And Dave) Notes, May 18, 1995 (p. 491).
Redacted Correspondence From Ron Barber/To Brett Jelkin, May 26, 1995 (pp. 492-494).
Redacted Quote From C. C. Edwards/To Ron Heglin With Handwritten Notes From Ron H., May 26, 1995 (p. 495).
Memorandum From Jack Holmes/To Ron Heglin, May 26, 1995 (p. 496).
Redacted Memorandum With Worksheets From Brett Jelkin/To Jerry Hoffman With Handwritten Notes, Jun. 2, 1995 (pp. 497-503).
Same as No. 43 (Redacted Clean Copy), Jun. 2, 1995 (pp. 504-508).
Graphs, Undated (pp. 509, 510).
Fax From Doug Brackhan/To Jerry Hoffman, Brett Jelkin And Tim Shafer, Jun. 5, 1995 (pp. 511-512).
Redacted Fax From Brett Jelkin/To Jon Cronk, Jun. 14, 1995 (p. 513).
Redacted Specifications, Jun. 15, 1995 (pp. 514-518).
Redacted Worksheets, Undated (pp. 519-524).
Redacted Status Report on IHLP-6042-01 68uH 15% With Handwritten Notes, Worksheets By Bruce Tschosik, Jul. 1995 (pp. 525-540).
Memorandum From Bruce Tschosik/To Dan Korus And Mike Husman, Jul. 7, 1995 (pp. 541-542).
Graphs, Aug. 2, 1995 (pp. 543-545).
Graphs, Aug. 3, 1995 (pp. 546-549).
Redacted Telephone Conversation Report From Brett Jelkin/To Jon Cronk, Aug. 7, 1995 (p. 550).
Memorandum From Bruce Tschosik/To Dan Korus, Mike Husman, Gene Gorsett And Jerry Hoffman, Aug. 9, 1995 (pp. 551-554).
Handwritten Specifications, Sep. 1, 1995 (pp. 555-556).
Redacted Memorandum, Sep. 1, 1995, With Handwritten Notes, Sep. 5 and Sep. 11, 1995 (pp. 557-558).
Correspondence From Bruce Lowden/To Timothy Shafer, Sep. 13, 1995 (p. 559).
Correspondence From Michael Johansen/To Timothy Shafer, Nov. 6, 1995 (pp. 560-561).
Redacted Handwritten Notes, Sep. 14, 1995 (p. 562).
Handwritten Yankton Division Visitor Notice From Bruce Tschosik Of Jon Cronk's Visit, Sep. 11, 1995 (p. 563).
Redacted Fax, Design Ideas From Jon Cronk/To Bret Jelkin And Tim Schaffer, Oct. 4, 1995 (pp. 564-567).
Redacted Correspondence From Dan Korus/To Jon Cronk, Oct. 9, 1995 (p. 568).
Handwritten Notes, Apr. 9, 1996 (pp. 569-570).
Handwritten Notes, Apr. 10, 1996 (p. 571).
Handwritten Notes, May 2, 1996 (p. 572).
Handwritten Notes, May 8, 1996 (p. 573).
Handwritten Notes, May 16, 1996 (p. 574).
Handwritten Routing Slip From Brett J./To Jerry H. And Gene, May 23, 1996 (p. 575).
Memorandum From Mike Husman/To Dan Korus and Gene Gorsett, May 30, 1996 (pp. 576-577).
National Semiconductor Meeting (Jon Cronk And Dudley Peters) Minutes, Dec. 19, 1996 (p. 578).
Redacted Request For Purchase Order From Tim Shafer, May 21, 1997 (p. 579).
Redacted Purchase Order, May 22, 1997 (p. 580).
Redacted Capital Appropriation Request, May 30, 1997 (p. 581).
Redacted 0470 Octagonal Body Inductance Calculations, Sep. 17, 1997 (p. 582).
Correspondence From Richard A. Heise/To Tim Shafer, Apr. 24, 1998 (p. 583).
Redacted Handwritten Notes, Apr. 28, 1998 (pp. 584-585).

Redacted Fax Quotation From Helenrae Budzilex/To Tim Schaeffer, Apr. 29, 1998 (p. 586).
Test Or Inspection Parameter & Specification Limit, Jun. 9, 1998 (pp. 587-588).
Test Or Inspection Parameter & Specification Limit, Jun. 11, 1998 (p. 589).
Graphs, Jun. 11, 1998 (pp. 590-593).
Redacted Handwritten Notes Of Teleconference With Mike Ward, Nov. 24, 1998 (p. 594).
Redacted Memorandum From Rod Brune/To Chuck Rose, Bill Fergus And Tim Shafer, Apr. 27, 1999 (p. 595).
Memorandum From Tim Shafer/To Jerry Hoffman And Gene Gorsett, Mar. 1, 1999 (p. 596).
Redacted Memorandum From H. D. Schmauss/To R. Rueschoff, D. Brackhan And G. Gorsett, Mar. 3, 1999 (p. 597).
Redacted Memorandum From Tim Shafer/To Jerry Wilcox, Mar. 4, 1999 (pp. 598-599).
Redacted Capital Appropriation Request, Feb. 12, 1999 (p. 600).
Redacted Memorandum From Tim Shafer/To Jerry Hoffman, Jul. 13, 1999 (pp. 601-602).
Memorandum From Tim Shafer/To Dave Lange, Chuck Holmes, Steve Bodenstedt, Ron Heglin, Rod Brune, Todd Huber And Darek Blow, Mar. 9, 1999 (pp. 603-607).
Handwritten Notes, Undated (pp. 608-609).
Coiltronics Incorporated Advertisements, PICO Electronics, Inc. Advertisement, Received Sep. 1995 (pp. 610-619).
Specifications, Undated (pp. 620-623).
Surface Mount Technology Brochure, Undated (pp. 624-625).
Drawings, Undated (pp. 626-629).
Handwritten Notes, Undated (p. 630).
Test Data From Brett Jelkin, Undated (pp. 631-632).
Handwritten Notes, Undated (p. 633).
IHLP Charts, Drawings, Undated (pp. 634-636).
Test Data From Brett Jelkin, Undated (pp. 637-638).
Preliminary DOP-121 IHLP-6042 Trim, Form, Test & Pack System, Undated (pp. 639-644).
Handwritten Notes, Undated (p. 645).
Handwritten Notes, Undated (p. 646).
Questionable Information, Undated (p. 647).
Handwritten Notes, Undated (p. 648).
Power Technologies, "Simple Switcher's Evolution" By Mohan Mankikar, Undated (p. 649).
Handwritten Specifications, Undated (p. 650).
Composite Design Project Outline, Undated (p. 651).
Redacted Notes, Undated (p. 652).
Drawing With Handwritten Notes, Undated (p. 653).
Specifications, Undated (pp. 654-655).
Graphs With Handwritten Notes, Undated (pp. 656-658).
Joint Industry Standard—Solderability Tests For Component Leads, Terminations, Lugs, Terminals And Wires, Sep. 1991 (pp. 659-679).
Redacted Handwritten Notes, Undated (p. 680).
Coiltronics Incorporated Brochure, Received 04/05/9? (pp. 681-683).
Redacted IHLP 38 & -47 High Current—Low Profile—Surface Mount Tooling Estimates, Undated (p. 684).
IHLP Series High Current, Low Profile Specifications, Drawings, Undated (pp. 685-686).
Specifications, Undated (p. 687).
Coiltronics Incorporated Brochure, Undated (pp. 688-690).
Redacted IHLP 38 & -47 High Current—Low Profile Surface Mount Tooling Estimates, Undated (p. 691).
Linear Technology, "Ultra-Low Power, High Efficiency DC/DC Converter: Operates Outside The Audio Band" By Mitchell Lee, Undated (p. 692).
Graph, Undated (p. 693).
Specifications, Undated (p. 694).
Redacted Identified Applications Applicable To IHLP Inductor Technology, Undated (p. 695).
PICO Electronics, Inc. Brochure, Undated (pp. 696-697).
Drawing, Undated (p. 698).
Redacted Tooling Costs, Undated (pp. 699-701).
Redacted Agenda For Customer/Field Rep Visit, Apr. 7, 1994 (p. 82).
Handwritten Notes, Apr. 7, 1994 (p. 83).
Redacted Handwritten Notes, Apr. 5, 1994 (p. 84).
Redacted Letter From John Cronk/To Eugene Gorsett, Apr. 5, 1994 (p. 85).
Handwritten Specifications, Apr. 12, 1994 (p. 86).
Redacted Handwritten Notes, Apr. 12, 1994 (p. 87).
Handwritten Notes Of NSC Phone Call, Apr. 12, 1994 (p. 88).
Redacted Handwritten Notes, Apr. 12, 1994 (pp. 89-90).
Redacted Telephone Conference Report From Jerry Hoffman/To Jon Cronk, Mike Patterson, Al Kelsch, B. Jelkin, T. Shafer, D. Sterns, J. Hoffman, D. Lange, And D. Nozicka, Apr. 12, 1994 (p. 91).
Redacted Factory Work Order Samples, Apr. 11, 1994 (pp. 92-102).
Redacted Fax From Mike Patterson/To Dave Nozicka, Apr. 13, 1994 (pp. 103-106).
Redacted Letter From Timothy Shafer/To Jon Cronk, Apr. 13, 1994 (p. 107).
Telephone Conversation Report From Dan Korusi/To Reno Rosetti, Apr. 14, 1994 (p. 108).
Redacted Handwritten Meeting Notes, Apr. 14, 1994 (p. 109).
Handwritten DC-DC Converter Inductor Competitor Analaysis, Apr. 14, 1994 (pp. 110-111).
Telephone Conversation Report From Dan Korusi/To Macy Keegan, Apr. 14, 1994 (p. 112).
Handwritten Telephone Conversation Report From Brett J./To Jon Cronk, Apr. 15, 1994 (p. 113).
Telephone Conversation Report From Tim Shafer/To Jon Cronk, Apr. 15, 1994 (p. 114).
Fax From Dave Nozicka/To Tim Shafer, Apr. 18, 1994 (pp. 115-116).
Handwritten Notes, Apr. 18, 1994 (p. 117).
Redacted Fax From Mike Patterson/To Brett Jelkin, Tim Shafer And Jerry Hoffman, Apr. 19, 1994 (pp. 118-119).
Telephone Conversation Report From Jerry Hoffman/To Mike Patterson, B. Jelkin, T. Shafer, J. Hoffman And Dale Yankton, Apr. 19, 1994 (p. 120).
Redacted Handwritten Notes, Apr. 19, 1994 (p. 121).
Redacted Draft Memorandum From Jerry Hoffman/To Brett Jelkin And Tim Shafer Circulated To Gene, Brett, Tim, Mike H., Jerry, Joe B., Ron H., Dan S., and Doug B. By J. Hoffman With Handwritten Notes, Apr. 19, 1994 (p. 122).
Same Memorandum As No. 24 With Redacted Handwritten Comments, Apr. 19, 1994 (p. 123).
Design And Development Plan, Apr. 19, 1994 (pp. 124-125).
Design And Development Plan With Handwritten Notes, Apr. 19, 1994 (p. 126).
Handwritten Notes, Apr. 20, 1994 (p. 127).
Handwritten Note From Brett J./To Jerry, Apr. 20, 1994 (p. 128).
Memorandum From Tim Shafer/To Dan Korus, Gene Gorsett, Jerry Hoffman, Brett Jelkin, Dan Starns And Doug Brackhan, Apr. 20, 1994 (p. 129).
Telephone Conversation Report From Dan Korusi/To Dennis Morticelli, Apr. 20, 1994 (p. 130).
Handwritten Notes, Apr. 20, 1994 (pp. 131-132).
Handwritten Meeting Notes, Apr. 20, 1994 (p. 133).
Redacted Memorandum From Tim Shafer/To Dan Korus, Gene Corselli, Jerry Hoffman, Brett Jelkin, Dan Starns and Doug Brackham, Apr. 20, 1994 (p. 134).
Redacted Handwritten Letter From Brett J./To Jerry, Apr. 20, 1994 (p. 135).
Handwritten Letter From Brett J./To Jerry, Apr. 20, 1994 (p. 136).
Fax From Reno Rossetti/To Dan Korus With Handwritten Notes Forwarded By Dan K./To Gene Jerry, Brett And Tim, Apr. 21, 1994 And Apr. 22, 1994, Respectively (pp. 137-140).
Redacted Telephone Conversation Report From Brett Jelkin/To Mike Patterson, Apr. 22, 1994 (pp. 141-142).
Handwritten Specifications, Apr. 23, 1994 (pp. 143-144).
Redacted Telephone Conversation Report From Brett Jelkin/To Jon Cronk, Apr. 25, 1994 (p. 145).
Memorandum From Tim Shafer/To Jerry Hoffman, Brett Jelkin And Dan Starns, Apr. 25, 1994 (p. 146).
Redacted Fax From Tim Shafer/To Herman Person, Apr. 25, 1994 (p. 147).
Redacted Telephone Conversation Report From D. Lange/To Tim Shafer, Apr. 25, 1994 (p. 148).

Redacted Handwritten Memorandum From Jerry/To Gene, Apr. 26, 1994 (pp. 149-150).
Fax Cover Sheet, Apr. 26, 1994 (p. 151).
Handwritten Notes, Apr. 26, 1994 (p. 152).
Memorandum From Jerry Hoffman/To Brett Jelkin And Tim Shafer, Apr. 26, 1994 (pp. 153-155).
Telephone Conversation Report From Brett Jelkin/To Mike Patterson, J. Hoffman, T. Shafer And B. Jelkin, Apr. 26, 1994 (p. 156).
Redacted Handwritten Notes, Apr. 26, 1994 (p. 157).
Redacted Telephone Conversation Report From Brett Jelkin/To Mike Patterson, Apr. 28, 1994 (p. 158).
Correspondence From Timothy M. Shafer/To Jon Cronk, Apr. 29, 1994 (p. 159).
Work Stoppage Notice, Signed By Donna Kuehler, May 10, 1994 (p. 160).
Telephone Conversation Report From Dan Korus/To Dennis Monticelli, May 2, 1994 (p. 161).
Handwritten Memorandum From Jerry/To Brett And Tim, May 2, 1994 (p. 162).
Telephone Conversation Report From Tim Shafer/To Mike Patterson, May 3, 1994 (p. 163).
Handwritten Specifications, May 3, 1994 (p. 164).
Statistics, Graph, May 3, 1994 (pp. 165-167).
Drawing, May 4, 1994 (p. 168).
Redacted Telephone Conversation Report From Dan Korus/To Dennis Monticelli, May 5, 1994 (p. 169).
Redacted Telephone Conversation Report (2 Copies) From David Lange/To Bret Jelkin, Tim Shafer, Doug Brackhan And David Lange, May 5, 1994 (pp. 170-171).
Redacted Telephone Conversation Report From Brett Jelkin/To Jon Cronk, May 6, 1994 (p. 172).
Redacted Telephone Conversation Report From Brett Jelkin/To Jon Cronk, May 6, 1994 (p. 173).
Redacted Telephone Conversation Report (2 Copies) From Brett Jelkin/To Jon Cronk And Mike Patterson, May 6, 1994 (pp. 174-175).
Redacted Correspondence From Jon Cronk/To Bret Jelkin And Tim Shafer, May 6, 1994 (pp. 176-177).
Handwritten Memorandum From Tim Shafer And Dale Yankton/To Dave Lange And Doug Brackhan, May 7, 1994 (p. 178).
Correspondence From Timothy M. Shafer/To Alan R. Duly, May 10, 1994 (pp. 179-180).
Telephone Conversation Report From Brett Jelkin/To Mike Patterson, Jon Cronk, B. Jelkin And T. Shafer, May 10, 1994 (p. 181).
Correspondence From Timothy M. Shafer/To Jon Cronk, May 11, 1994 (pp. 182-183).
EDN-Technology Update, "A Surfeit of Power-supply Voltages Plagues Designs of Compact Products", May 12, 1994 (pp. 184-187).
Hornady Multi-deluxe Powder Measure, Undated (p. 188).
Application Report From Keith Raiford/To Timothy Shafer, May 12, 1994 (p. 189).
Memorandum From Tim Shafer/To Dan Starns, May 12, 1994 (p. 190).
Memorandum From Kelly Kneifl/To Brett Jelkin And Tim Shafer, May 13, 1994 (p. 191).
Redacted Telephone Conversation Report From Jon Cronk And Mike Patterson/To Tim Shafer, Brett Jelkin And Jerry Hoffman, May 17, 1994 (p. 192).
Redacted Fax From Tim Shafer/To Mike Patterson, May 19, 1994 (pp. 193-194).
Factory Work Order, May 4, 1994 (p. 195).
Memorandum From Tim Shafer/To Dave Lange And Doug Brackhan, May 19, 1994 (pp. 196-197).
Fax Cover Sheet, May 19, 1994 (p. 198).
Handwritten Correspondence From Jerry/To Brett And Tim, May 23, 1994 (p. 199).
Redacted Specifications, Undated (p. 200).
Redacted Telephone Conversation Report From Dan Corus/To Dennis Monticelli, May 24, 1994 (p. 201).
Redacted Telephone Conversation Report From Brett Jelkin/To Jon Cronk, B. Jelkin, T. Shafer And J. Hoffman, May 24, 1994 (p. 202).
Handwritten Specifications, May 24, 1994 (pp. 203-205).
Redacted Telephone Conversation Report From Brett Jelkin/To Jon Cronk, B. Jelkin, T. Shafer And J. Hoffman, May 24, 1994 (p. 206).
Redacted Quotation From Tim Kavanaugh/To Tim Shafer, May 25, 1994 (pp. 207-210).
Redacted Quotation From Kelly Kneifl/To Jon Cronk, May 26, 1994 (pp. 211-214).
Redacted Specifications, May 24, 1994 (pp. 215-220).
Redacted Quotation From Kelly Kneifl/To Macey Keegan, May 26, 1994 (pp. 221-225).
Telephone Conversation Report With Jon Cronk, Mike Patterson, Tim Shafer And Brett Jelkin, May 31, 1994 (p. 226).
Handwritten Specifications, Undated (p. 227).
Correspondence From Tim Shafer/To Alan Duly, Jun. 1, 1994 (p. 228).
Handwritten Specifications, Jun. 2, 1994 (pp. 229-230).
Redacted Telephone Conversation Report From Brett Jelkin/To Jon Cronk, B. Jelkin, T. Shafer And J. Hoffman, Jun. 7, 1994 (pp. 231-232).
Redacted Handwritten Notes, Jun. 7, 1994 (pp. 233-234).
Redacted Telephone Conversation Report From Brett Jelkin/To Jon Cronk, Jun. 7, 1994 (p. 235).
Handwritten Correspondence From Dalen Meisinger/To Tim, Undated (p. 236).
Handwritten Correspondence From Dalen Meisinger/To Tim, Jun. 7, 1994 (p. 237).
Handwritten Specifications, Jun. 8, 1994 (p. 238).
Correspondence from Timothy M. Shafer/To Jon Cronk, May 10, 1994 (pp. 239-240).
Handwritten Specifications, Jun. 10, 1994 (p. 241).

* cited by examiner

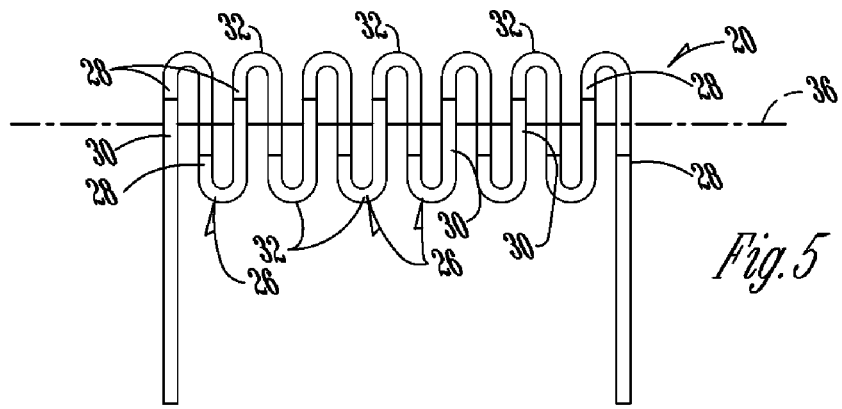
Fig. 5
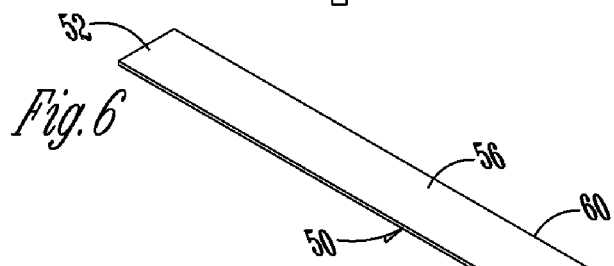
Fig. 6
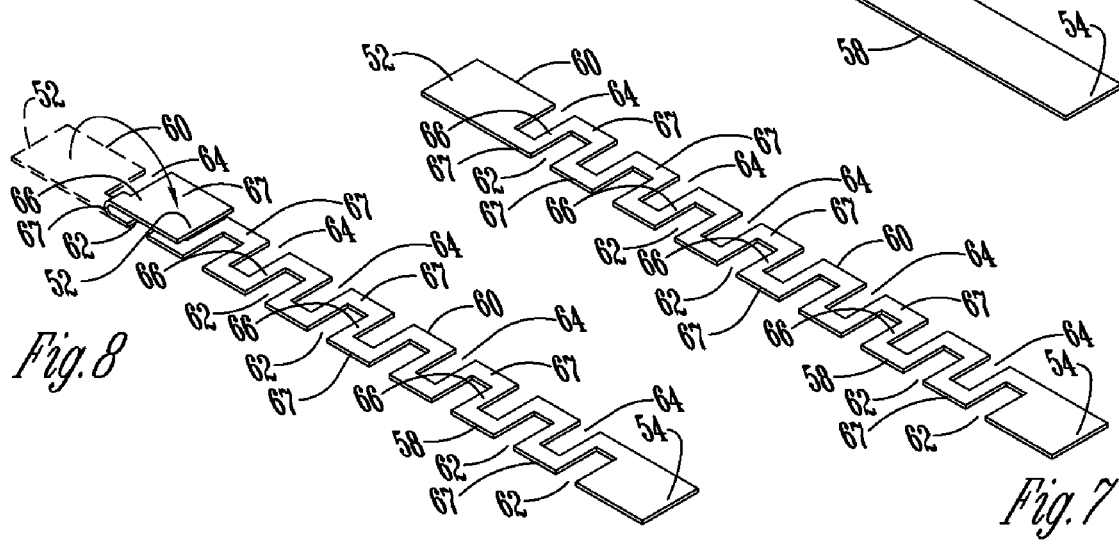
Fig. 7
Fig. 8
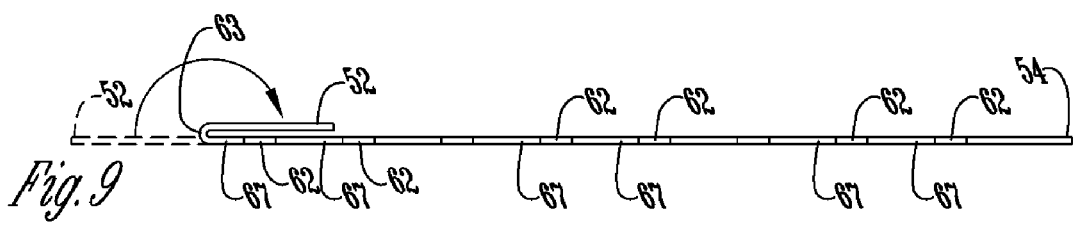
Fig. 9
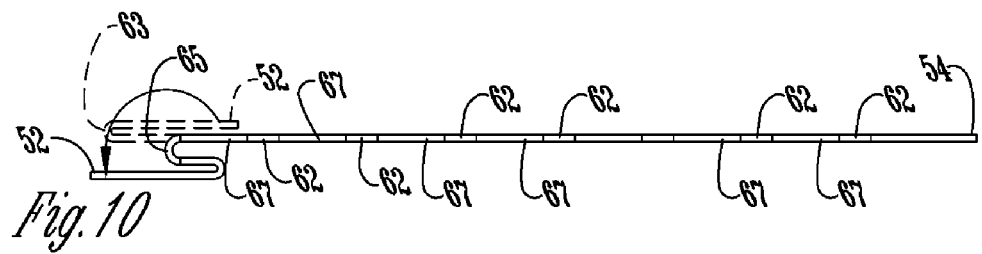
Fig. 10

METHOD FOR MAKING A HIGH CURRENT LOW PROFILE INDUCTOR

CROSS REFERENCE TO RELATED APPLICATIONS

This application is a divisional application of U.S. application Ser. No. 11/782,020 filed Jul. 24, 2007, now U.S. Pat. No. 7,345,562, which is a divisional application of U.S. application Ser. No. 11/609,165 filed Dec. 11, 2006, now U.S. Pat. No. 7,263,761, which is a divisional application of U.S. application Ser. No. 11/409,651 filed Apr. 24, 2006, now U.S. Pat. No. 7,221,249, which is a divisional application of U.S. application Ser. No. 11/038,880 filed Jan. 20, 2005, now U.S. Pat. No. 7,034,645, which is a divisional application of U.S. application Ser. No. 10/244,777, filed Sep. 16, 2002, now U.S. Pat. No. 6,946,944, which is a continuation of U.S. application Ser. No. 09/546,859 filed Apr. 10, 2000, now U.S. Pat. No. 6,449,829, which is a divisional of U.S. application Ser. No. 09/271,748, filed Mar. 18, 1999, now U.S. Pat. No. 6,198,375. U.S. application Ser. No. 10/244,777, filed Sep. 16, 2002, now U.S. Pat. No. 6,946,944, is also a continuation of U.S. application Ser. No. 09/547,155, filed Apr. 11, 2000, now U.S. Pat. No. 6,460,244, which is a divisional of U.S. application Ser. No. 08/963,224, filed Nov. 3, 1997, now U.S. Pat. No. 6,204,744, which is a continuation of U.S. application Ser. No. 08/503,655 filed Jul. 18, 1995, now abandoned.

The Specification and Drawings of application Ser. No. 09/547,155, now U.S. Pat. No. 6,460,244, are hereby incorporated by reference.

BACKGROUND OF THE INVENTION

The present invention relates to an inductor coil structure and method for making same. The coil structure of the present invention is preferably for use in a high current low profile inductor commonly referred to by the designation IHLP. However, the particular coil structure may be used in other types of inductors.

Inductor coils have in the prior art been constructed from various shapes of materials formed into various helical shapes. However, there is a need for an improved inductor coil structure which is simple to manufacture and which provides an efficient and reliable inductance coil.

Therefore, a primary object of the present invention is the provision of an improved inductor coil structure and method for making same.

A further object of the present invention is the provision of an inductor coil structure which can be used in a high current low profile inductor having no air spaces in the inductor, and which includes a magnetic material completely surrounding the coil.

A further object of the present invention is the provision of an inductor coil structure which includes a closed magnetic system which has self-shielding capability.

A further object of the present invention is the provision of an inductor coil structure which maximizes the utilization of space needed for a given inductance performance so that the inductor can be of a minimum size.

A further object of the present invention is the provision of an improved inductor coil structure which is smaller, less expensive to manufacture, and is capable of accepting more current without saturation than previous inductor coil structures.

A further object of the present invention is the provision of an inductor coil structure which lowers the series resistance of the inductor.

SUMMARY OF THE INVENTION

The foregoing objects may be achieved by a high current low profile inductor comprising a conductor coil having first and second coil ends. A magnetic material surrounds the conductor coil to form an inductor body. The inductor coil comprises a plurality of coil turns extending around a longitudinal coil axis in an approximately helical path which progresses axially along the coil axis. The coil turns are formed from a flat plate having first and second opposite flat surfaces, at least a portion of each of the flat surfaces of the coil turns facing in a axial direction with respect to the coil axis.

The method for making the inductor includes taking an elongated plate conductor having a first end, a second end, opposite side edges, opposite flat surfaces, and a longitudinal plate axis. A plurality of slots are cut in each of the opposite side edges of the plate conductor so as to form the plate conductor into a plurality of cross segments extending transversely with respect to the plate axis and a plurality of connecting segments extending approximately axially with respect to the plate axis. The connecting segments connect the cross segments together into a continuous conductor which extends in a sine shaped path. As used herein the term "sine shaped" refers to any shape which generally conforms to a sine curve, but which is not limited to a continuous curve and may include apexes, squared off corners or other various shapes.

After cutting the slots in the opposite side edges of the plate conductor the connecting segments are bent along one or more bend axes extending transversely with respect to the plate axis so as to form the plate conductor into a plurality of accordion folds, each of which comprise one of the cross segments and a portion of one of the connecting segments. In the resulting structure, the cross segments and the connecting segments form a continuous conductor coil of approximate helical shape having first and second opposite ends.

BRIEF DESCRIPTION OF THE FIGURES OF THE DRAWINGS

FIG. 5 is an elevational view taken along lines 5-5 of FIG. 4.

FIG. 6 is a perspective view of an elongated conductor blank from which the inductor coil is formed.

FIG. 7 shows the blank of FIG. 6 after the formation of slots extending inwardly from the opposite edges thereof.

FIG. 8 is a view similar to FIG. 7, showing the first folding step in the formation of the inductor coil of the present invention.

FIG. 9 is a side elevational view showing the same folding step shown in FIG. 8.

FIG. 10 is a view similar to 8 and showing a second folding step in the process for making the inductor coil of the present invention.

DETAILED DESCRIPTION OF THE PREFERRED EMBODIMENT

Figure 1:
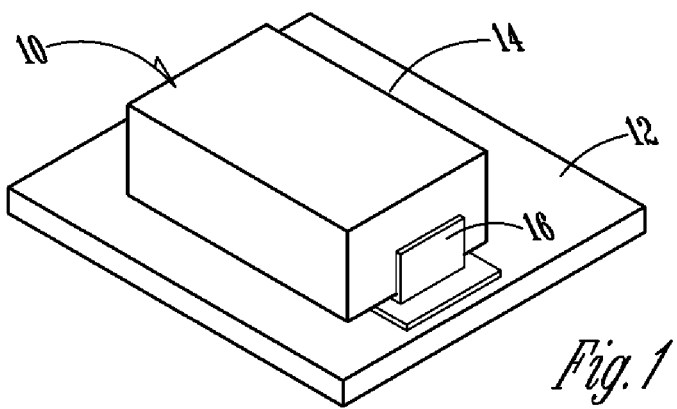
FIG. 1 is a perspective view of the inductor constructed in accordance with the present invention and mounted upon a circuit board.

Referring to the drawings the numeral 10 generally designates an inductor of the present invention mounted upon a circuit board 12. Inductor 10 includes an inductor body 14 having a first lead 16 and a second lead 18 extending therefrom and being folded over the opposite ends of body 14. Leads 16, 18 are soldered or otherwise electrically connected on the circuit board 12.

Figure 2:
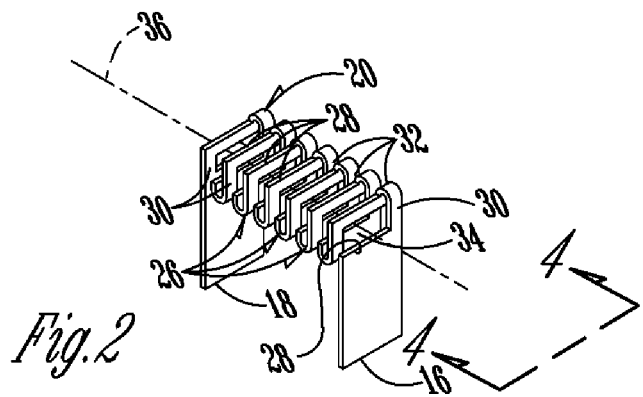
FIG. 2 is a pictorial view of the coil of the inductor before the molding process.
Figure 3:
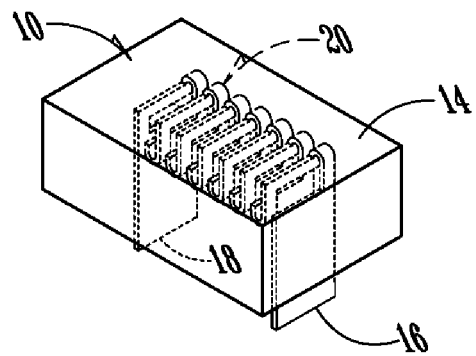
FIG. 3 is a pictorial view of the inductor of the present invention after the molding process is complete, but before the leads have been formed.
Figure 4:
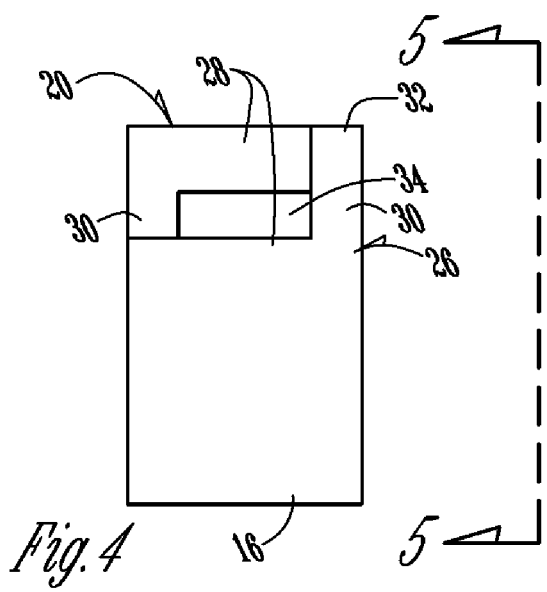
FIG. 4 is an end elevational view taken along line 4-4 of FIG. 2.

Referring to FIG. 2, the inductor coil of the present invention is generally designated by the numeral 20. Leads 16, 18 form the ends of coil 22. Between leads 16, 18 are a plurality of L-shaped coil segments 26 each comprising a horizontal leg 28 and a vertical leg 30. Vertical leg 30 terminates at a connecting segment 32 which is folded over at approximately 180° so as to create an accordion like configuration for inductor coil 20. The L-shaped coil segments are connected together to form a helical coil having an open coil center 34 extending along a longitudinal coil axis 36.

FIGS. 6-10 show the process for making the coil 20. Initially as shown in FIG. 6 a blank flat conductor plate 50 formed of copper or other electrically conductive material includes: first and second ends 52, 54; a pair of opposite flat surfaces 56; and a pair of opposite side edges 58, 60.

FIG. 7 shows the first step in forming the coil 20. In this step a plurality of slots 62, 64 are cut in the opposite edges 58, 60 respectively of the blank flat plate 50. Various cutting methods may be used such as stamping or actual cutting by laser or other cutting tools known in the art.

Upon completion of the cutting operation, the blank 50 is transformed into an elongated sine shaped body formed from a plurality of cross segments 66 extending transversely to the longitudinal axis of plate 50 and a plurality of connecting segments 67 extending axially with respect to the longitudinal axis of plate 50. The segments 66, 67 form a continuous sine shaped configuration as shown in FIG. 7.

FIG. 8 shows the next step in forming the coil 20. The end 52 is folded over at an angle of 180° to form the 180° angle bend 63 in the first connecting segment 67. FIG. 10 shows a second bend 65 which is in the next connecting segment 67. Bends 63, 65 are in opposite directions, and are repeated until an accordion like structure is provided similar to that shown in FIG. 5.

In FIG. 5 the coil 20 includes opposite ends 16, 18 which are formed from the opposite ends 52, 54 of blank 50. The cross segments 66 of blank 50 form the first horizontal legs 28 of coil 20, and the connecting segments 67 of blank 50 form the second vertical legs 30 and the connecting segments 32 of coil 20.

An example of a preferred material for coil 20 is a copper flat plate made from OFHC copper 102, 99.95% pure.

The magnetic molding material of body 14 is comprised of a powdered iron, a filler, a resin, and a lubricant. The preferred powdered material is manufactured by BASF Corporation, 100 Cherryhill Road, Parsippany, N.J. under the trade designation Carbonyl Iron, Grade SQ. This SQ material is insulated with 0.875% mass fraction with 75% $H_3PO_4$.

An epoxy resin is also added to the mixture, and the preferred resin for this purpose is manufactured by Morton International, Post Office Box 15240, Reading, Pa. under the trade designation Corvel Black, Number 10-7086.

In addition a lubricant is added to the mixture. The lubricant is a zinc stearate manufactured by Witco Corporation, Box 45296, Houston Tex. under the product designation Lubrazinc W.

Various combinations of the above ingredients may be mixed together, but the preferred mixture is as follows:

1,000 grams of the powdered iron.
3.3% by weight of the resin.
0.3% by weight of the lubricant.

The above materials (other than the lubricant) are mixed together and then acetone is added to wet the material to a mud-like consistency. The material is then permitted to dry and is screened to a particle size of −50 mesh. The lubricant is then added to complete the material. The material is then ready for pressure molding.

The next step in the process involves compressing the material completely around the coil 20 so that it has a density produced by exposure to pressure of from 15 to 25 tons per square inch. This causes the powdered material to be compressed and molded tightly completely around the coil so as to form the inductor body 14 shown in FIG. 1 and in FIGS. 11-13.

Figure 11:
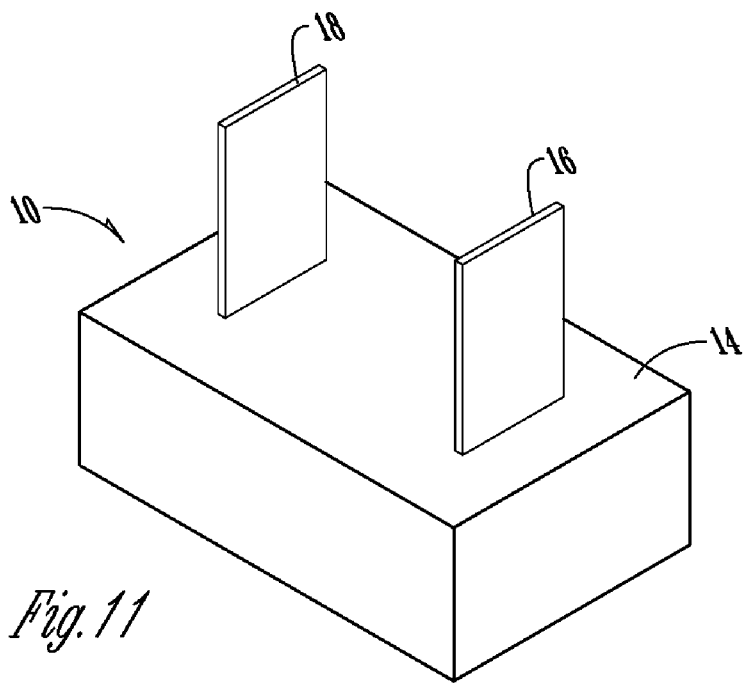
FIG. 11 is an inverted pictorial view of the inductor after it has been pressed, but before the leads have been formed.
Figure 12:
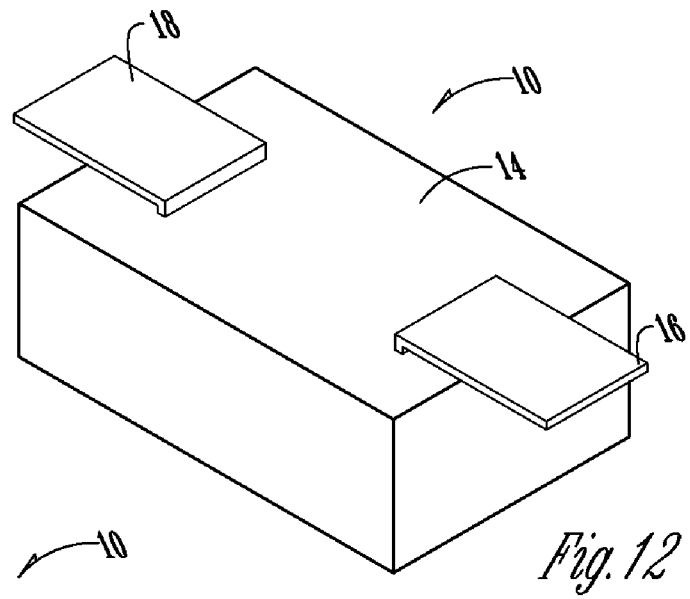
FIG. 12 is a view similar to FIG. 11 showing the inductor after partial forming of the leads.
Figure 13:
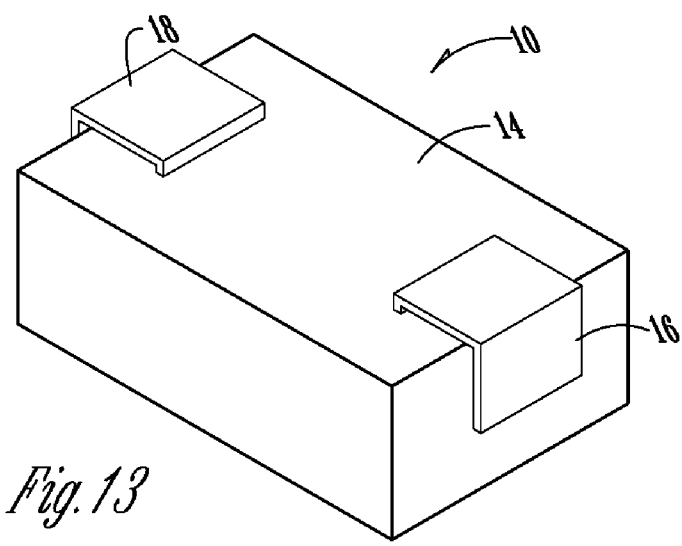
FIG. 13 is a view similar to FIGS. 11 and 12 showing the final forming of the leads.

At this stage of the production the molded assembly is in the form which is shown in FIG. 11. After baking, the leads 16, 18 are formed or bent as shown in FIGS. 12 and 13. The molded assemblies are then baked at 325° F. for one hour and forty-five minutes to set the resin.

When compared to other inductive components the IHLP inductor of the present invention has several unique attributes. The conductive coil, lead frame, magnetic core material, and protective enclosure are molded as a single integral low profile unitized body that has termination leads suitable for surface mounting. The construction allows for maximum utilization of available space for magnetic performance and is magnetically self-shielding.

The unitary construction eliminates the need for two core halves as was the case with prior art E cores or other core shapes, and also eliminates the associated assembly labor.

The unique conductor winding of the present invention allows for high current operation and also optimizes magnetic parameters within the inductor's footprint.

The manufacturing process of the present invention provides a low cost, high performance package without the dependence on expensive, tight tolerance core materials and special winding techniques.

The magnetic core material has high resistivity (exceeding 3 mega ohms) that enables the inductor as it is manufactured to perform without a conductive path between the surface mount leads. The magnetic material also allows efficient operation up to 1 MHz. The inductor package performance yields a low DC resistance to inductance ratio of two milliOhms per microHenry. A ratio of 5 or below is considered very good.

The unique configuration of the coil 20 reduces its cost of manufacture. Coil 20 may be used in various inductor configurations other than IHLP inductors.

In the drawings and specification there has been set forth a preferred embodiment of the invention, and although specific terms are employed these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method for making a high current low profile inductor comprising:
    forming an inductor element comprising a coil having and open center and an outside surface;
    insulating a magnetic powder;
    making a dry mixture comprising a dry resin and a dry insulated magnetic powder by wetting the mixture of resin and magnetic powder and then drying the wetted mixture and then screening the mixture to a predetermined particle size, and then;
    compressing the mixture while the mixture is dry around the outside surface of the coil and within the open center of the coil to create an inductor body, whereby the inductor body engages the coil both within the coil open center and also the coil outside surface.

2. The method of claim 1 wherein the predetermined particle size being a particle size of −50 mesh.

* * * * *